United States Patent [19]

Verdouw

[11] Patent Number: 4,796,429
[45] Date of Patent: Jan. 10, 1989

[54] COMBUSTOR DIFFUSER

[75] Inventor: Albert J. Verdouw, Indianapolis, Ind.

[73] Assignee: General Motors Corporation, Detroit, Mich.

[21] Appl. No.: 742,289

[22] Filed: Nov. 15, 1976

[51] Int. Cl.[4] .............................................. F02C 1/00
[52] U.S. Cl. ..................................................... 60/751
[58] Field of Search .................. 60/39.65, 39.66, 39.74, 60/751

[56] References Cited

U.S. PATENT DOCUMENTS

| 2,556,161 | 6/1951 | Bailey et al. | 60/39.65 |
|---|---|---|---|
| 2,807,316 | 9/1957 | Jackson | 60/39.65 |
| 2,988,886 | 6/1961 | Hamm et al. | 60/39.65 |
| 3,736,746 | 6/1973 | DuBell et al. | 60/39.74 R |
| 3,777,489 | 12/1973 | Johnson et al. | 60/39.66 |
| 3,811,278 | 5/1974 | Taylor et al. | 60/39.74 R |
| 3,853,273 | 12/1974 | Bahr et al. | 60/39.74 R |

OTHER PUBLICATIONS

"A Short Diffuser with Low Pressure Loss", by R. C. Adkins presented at ASME-CSME Fluids Engineering Conference, May 13-15, 1974, Montreal, Quebec, Canada.

Primary Examiner—Donald P. Walsh
Attorney, Agent, or Firm—Saul Schwartz

[57] ABSTRACT

A combustor diffuser assembly for a gas turbine engine includes a prediffuser for receiving compressed air from a gasifier impeller of a gas turbine engine and for directing it into the inlet of a vortex controlled downstream diffuser and wherein the prediffuser and vortex controlled diffuser are spaced to form gaps for air bleed to form vortices to minimize bleed and main diffuser flow pressure drop and to minimize distortion in compressed air flow to plural passages leading to primary and secondary air openings in the inner and outer walls of an annular combustor assembly for the gas turbine engine.

4 Claims, 1 Drawing Sheet

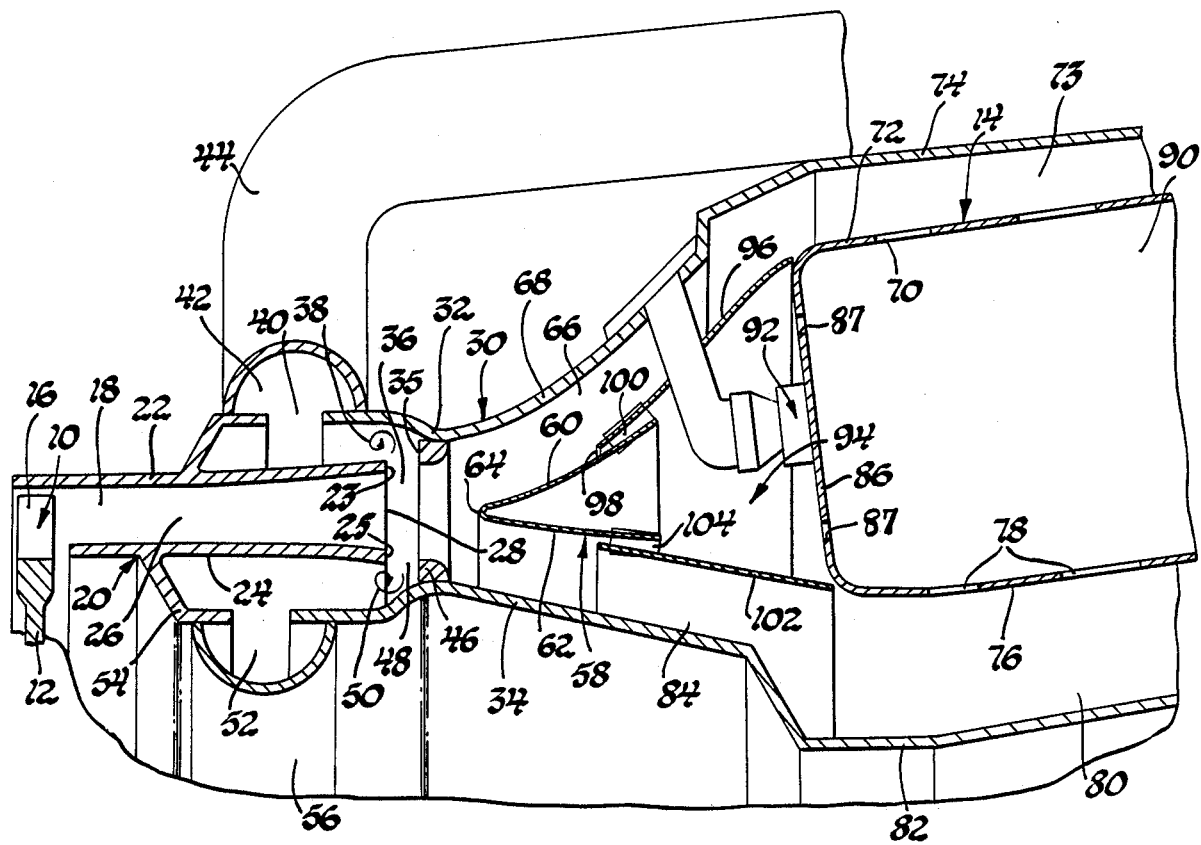

COMBUSTOR DIFFUSER

The invention herein described was made in the course of work under a contract or subcontract thereunder with the Department of Defense.

This invention relates to gas turbine engines and more particularly to air diffuser assemblies for directing combustion air to combustor assemblies in gas turbine engines.

U.S. Pat. No. 3,877,221 issued Apr. 15, 1975, to Lefebvre discloses an air supply system for receiving high inlet velocity air from a compressor having a broad operating range and to diffuse high velocity air from the compressor to produce a high pressure recovery with low pressure drop into gas turbine combustion apparatus of the annular type by the provision of a communicating passage from the central passage of a three passage diffuser arrangement to divide compressor air flow and direct it into the inner and outer walls of an annular combustor and into a dome shaped forward wall .cf the combustor assembly. The combustion apparatus air supply system disclosed in the aforesaid Lefebvre et al patent is suitable for its intended purpose. However, under conditions of elevated inlet air velocities more efficient diffusers are required to hold pressure losses to a reasonable level as well as to assure uniform pressure distribution to a gas turbine engine combustor assembly.

Accordingly, an object of the present invention is to improve the operation of gas turbine combustion apparatus particularly those of the annular type by the provision of an inlet diffuser arrangement including an aligned prediffuser and a vortex controlled downstream diffuser operative to direct uniform air pressure into the inner and outer wall of an annular combustion liner and into the forward wall thereof irrespective of variations in the pressure and velocity profile of air delivered to the combustion apparatus from an upstream compressor unit.

Still another object of the present invention is to provide an improved gas turbine engine having a diffuser assembly for directing air to the inner and outer walls of an annular combustion liner as well as to an annular forward wall portion of the combustion assembly wherein an upstream prediffuser applies air to a vortex controlled diffuser to produce a high diffuser effectiveness in a short diffuser length and with a minimized diffuser pressure loss.

Still another object of the present invention is to provide an improved diffuser assembly for distributing high velocity inlet air to the inside and outer walls of an annular compressor having an inlet dome by the provision of an inlet prediffuser having a ratio of outlet flow area to inlet flow area of approximately 1.5 to minimize distortion in the velocity profile of flow into a vortex controlled diffuser as well as to minimize bleed flow pressure drop from the vortex controlled diffuser so as to maximize the diffuser effectiveness (actual static pressure rise divided by the ideal static pressure rise) in the assembly and to do so while maintaining a minimal pressure loss from the compressor to air ports in the outer and inner walls of the combustor as well as in the dome portion thereof.

Still another object of the present invention is to provide an improved combustor diffuser assembly including a prediffuser having an inlet in communication with the discharge of an air compressor for directing high velocity inlet air to the diffuser assembly and including an outlet in axially spaced alignment with a downstream multi-passage diffuser structure having a vortex control bleed gap therein for bleed of air from the air discharge through the diffuser assembly to a point of use in the engine and wherein the bleed flow controls distortion in the flow velocity profile within the diffuser assembly so that uniform air supply will be directed to both the outer and inner walls of an annular combustion type apparatus irrespective of variations in the pressure and velocity profile of the air delivered into the inlet of the diffuser assembly and wherein the uniform flow in part produced by passages through inner and outer portions of the diffuser assembly and a flow splitter segment thereon including means to direct boundary layer segments of the air flow in the vortex flow control diffuser assembly into an inlet dome portion of the annular combustion apparatus.

Further objects and advantages of the present invention will be apparent from the following description, reference being had to the accompanying drawings wherein a preferred embodiment of the present invention is clearly shown.

FIG. 1 is a fragmentary vertical sectional view of a combustion apparatus of a gas turbine engine taken in a plane containing the axis of the engine and illustrating the diffuser air supply system of the present invention; and FIG. 2 is a sectional view like FIG. 1 showing a second embodiment of the present invention.

Referring now to the drawing, in FIG. 1 an axial flow type compressor 10 is illustrated having a disc portion 12 adapted to be connected to gasifier turbine the details of which form no part of the present invention; it being understood that motive power for the gasifier turbine is directed from a combustion apparatus 14 of the annular type located downstream of the compressor 10.

More particularly, compressor 10 includes a plurality of radially outwardly directed blades 16 thereon spaced circumferentially around the disc 12 and located in the inlet 18 to a prediffuser 20 having an annular outer wall 22 and an annular inner wall 24 that form a divergent passage 26 intercommunicating the annular inlet 18 and with end surfaces 23, 25 on walls 22, 24 that form an annular outlet 28. The annular inlet 18 and annular outlet 28 preferably have a ratio of outlet flow area to inlet flow area of approximately 1.5 to convert high velocity inlet air to a first static pressure level and to stabilize the flow velocity profile.

In apparatus of the aforesaid type and in cases where high inlet velocities are experienced, one operating characteristic of such gas turbine engines is that the air supply for the gas turbine engine is subject to wide variations in pressure and velocity profiles. The upstream prediffuser 20 therefore is associated with a vortex controlled diffuser 30 having an outer annular wall 32 and an inner annular wall 34. The inner surface of the outer annular wall 32 supports a radially inwardly directed fence 35 immediately downstream of the downstream edge of the annular wall 22 to form an annular bleed gap 36 between the outlet of the prediffuser 20 and the inlet of the vortex controlled diffuser 30. The gap 36 forms fluid vortices 38 that flow to an outer annular cavity 40 in wall 32 where air bled from the gap 36 is conducted into a duct opening 42 from whence the high pressure air is directed through suitable duct means 44 to a point of use.

Likewise, the vortex controlled diffuser 30 includes an abrupt radially inwardly directed fence 46 thereon of annular configuration on the inner wall 34. It forms a bleed gap 48 with respect to the outlet end of the inner wall 24 of the prediffuser 20. Air bled from the inner wall 24 will pass through the gap 48 and form vortices 50. The bleed air interacts with the main flow to adjust main flow conditions to improve diffusion effectiveness in a short length with minimum losses. The bleed air is directed from the manifold 52 in wall 54 by suitable duct means 56 to a point of use such as turbine cooling air.

The provision of a generally diverging prediffuser 20 will maintain velocity profile and will thus minimize distortion within the velocity profile in air supplied to the combustion apparatus 14. Moreover, the bleed flow pressure drop will be minimized at a transition from the prediffuser 20 to the vortex controlled diffuser 30. Immediately downstream of the gaps 36, 48 the apparatus includes a flow splitter 58 including an outer annular slightly concavely configured wall segment 60 and an inner annular wall segment 62 both joined to an annular tip 64 located approximately midpoint of the fences 35, 46. The fences 35, 46 stabilize the flow and the splitter 58 will divide it into a first, constant area annular passage 66 formed between the wall segment 60 and an outwardly divergent wall segment 68 of the diffuser 30. Passage 66 flow is controlled by gap 36 and the flow passes to a plurality of primary air ports 70 formed in an outer annular wall 72 of the combustion apparatus 14 at a point radially inwardly of annular supply passage 73 in a outer annular housing 74 of the engine.

The combustion apparatus 14 further includes an inner annular wall 76 with primary air ports 78 therein which are in communication with an inner annular supply passage 80 formed by an inner housing member 82 which communicates with a second constant area passage 84 in the diffuser 30 which has air flow therein under the control of the vortex producing gap 48. An equal pressure drop occurs across the primary air ports 70, 78 into the combustor apparatus 14. In addition to the primary air ports 70, 78 the apparatus 14 includes an annular upstream inlet dome 86 that has primary air entrance holes 87, diagrammatically shown, it being understood that the holes are included to supply air to a primary combustion zone 90 for burning fuel directed from a nozzle assembly 92 supported on the annular inlet dome 86. Air to the combustion apparatus 14 is from a plenum 94 that has air supplied thereto from a first annular scoop 96 having an inlet end 98 spaced from the outer surface of the annular wall 60 and supported with respect thereto by a plurality of circumferentially spaced braces 100 connected between the outer surface of the wall segment 60 and the inner surface of the scoop 96. The scoop 96 takes boundary layer air from the outer wall 60 for transfer into the plenum 94. It further serves to define a smooth transition for flow from the passage 66 to the annular space between the combustion apparatus 14 and the housing 74.

Boundary layer on the outer surface of the annular wall 62 of splitter 58 likewise is diverted by a annular scoop 102 having its inlet end overlying the outlet surface of the wall 62 for diverting air into the plenum 94. The inlet end of the scoop 102 is supported by a plurality of circumferentially spaced braces 104 to position the scoop 102 with respect to the splitter 58 so as to divert air into the plenum 94 and also to locate the scoop 102 to form a smooth transition in the passage 84 to the annular inner passage 80.

By virtue of the aforedescribed arrangement the overall effectiveness of the diffuser is enhanced in that the ratio of actual static pressure rise divided by ideal static pressure rise is maximized and is accomplished within a short diffuser assembly length while maintaining a reduced pressure loss from the inlet 18 of the diffuser to the inner and outer walls 76, 72 of the annular combustion apparatus 14.

The diffuser assembly accommodates a wide variation in inlet velocity and pressure changes in the air flow to the combustion apparatus 14. The gaps 36 and 48 bleed off low pressure boundary air flow that form vortices 38 and 50. The bleed flow interacts with the main air flow to the combustion apparatus assuring a uniform and short length positive conversion of high velocity air to pressure energy which is balanced at the inner and outer walls 72, 74 of the combustion apparatus 14. This assures that pressure drop for directing air uniformly into the combustion apparatus will be the same, so that equal amounts of air will flow into all parts of the primary combustion chamber 90 for improved uniformity of combustion of air/fuel.

A second embodiment of the invention is shown in FIG. 2 which includes an air supply compressor 106 like compressor 10. It discharges through a prediffuser assembly 108 including an inlet 110 formed between an annular outer wall 112 and an inner annular wall 114 which diverge at the downstream ends 116, 118 thereof to form a divergent annular diffuser passage 120 which has a ratio of outlet area to inlet area greater than the diffuser assembly 26 in the first embodiment. In this arrangement a vortex controlled downstream diffuser 122 is located and arranged with respect to the outlet from the prediffuser diffuser 120 to define a shorter air path from the air-supply compressor 106 to the annular inlet dome 124 of an annular combustion apparatus 126 having an annular inner wall 128 and an annular outer wall 130. In this configuration, the diffuser 122 has a flow splitter 132 with a tip 134 and an annular wall segment 136 in spaced parallel relationship to the inner surface of the downstream end 116 of wall 112 and an annular inner wall segment 138 located in generally paced parallelism to the inner surface of the downstream end 118 of the wall 114.

The flow splitter 132 is inserted a substantial distance into the prediffuser 120 which serves, as in the case of the first embodiment, to convert high velocity energy into pressure while minimizing distortion in the flow directed towards the combustion assembly 126. The greater divergence of the passageway 120 accommodates the flow splitter 132 and directs a first portion of the high velocity air flow into an outer annular passage 140 that has an outer annular fence 142 located therein to extend radially inwardly of an annular outer wall 144 at a point immediately upstream of the outlet of the prediffuser 108. An annular gap 146 is defined therebetween for bleed of unstable air flow from the passage 140. Bleed from the gap 146 is in the form of a plurality of vortices 148 within a cavity 150 connected by suitable duct means 152 to a point of use such as turbine cooling air. Thus, flow distribution in the passage 140 is stabilized and pressure conversion occurs therein with a minimal pressure loss prior to passage into an annular opening 154 located between an outer engine housing 156 and the outer wall 130 of the annular combustion apparatus 126 from whence air is directed through primary air ports 158 in the outer wall 130 into a primary combustion zone 160.

Likewise, the splitter wall segment 138 directs air flow from the prediffuser 120 into an inner annular diffuser passage 162 having a radially inwardly directed fence 164 directed radially outwardly from the inner surface of an annular wall 166 of the diffuser 122. It is spaced with respect to the end 118 of the prediffuser wall 114 to define a bleed gap 168 therebetween to bleed unstable inlet air as vortices 170 to convert high velocity inlet air to pressure energy to flow through an annular duct 172 to a point of use such as the inlet of the turbine as set forth above.

Stabilized, divided air flow through the passage 162 is directed into an annular space 174 around the inner wall 128 and inboard of an annular engine housing 176. Pressure, by virtue of the aforedescribed arrangement, is maintained uniform in the open spaces 154, 174 and air flow into the combustion chamber 116 is maintained uniform at both the inner and outer walls 128, 130 of the combustion apparatus 126. In the inner wall 128 air flow to the combustion zone 160 is through plurality of primary air ports therein.

Air flow ports 180 in the inlet dome 124 are supplied from a plenum 182 formed by the flow splitter 132; an outer annular scoop 184 and cooperating inner annular scoop 186 like scoops 96, 102 in the first embodiment. The air flow ports 180 are diagrammatic representations of holes to supply air through the inlet dome 124 for combustion with fuel within the combustion zone 160. The scoop 184 cooperates with the wall segment 136 of splitter 134 to divert boundary layer flow therefrom into the plenum 182 and a like inlet of scoop 186 cooperates with the outer surface of wall segment 138 to divert boundary layer flow from the inner wall of splitter 134 in the plenum 182 to produce a stable pressure condition for assuring air flow supply through the inlet dome 124 into the combustion zone 160 for combustion with fuel supplied by a nozzle assembly 188 like assembly 92 in the first embodiment.

A generalized theory vortex controlled diffusers is set forth in "A short Diffuser With Low Pressure Loss" by R. C. Adkins—Thermal Power Group, The School of Mechanical Engineering, Cranfield Institute of Technology, Cranfield, Bedfordshire, England—paper presented at the ASME-CSME Fluids Engineering Conference, May 13-15, 1974, Montreal, Quebec, Canada.

The embodiment of the invention illustrated in FIG. 1 incorporates a vortex controlled diffuser as a component in an integrated diffuser system for a gas turbine engine including a prediffuser, split flow path and combustor blockage to uniformly distribute inlet air flow with a varying degree of inlet distortion to three specific points in an annular combustion apparatus including the dome 86, the outer annular wall 72 and the inner annular wall 76. To accomplish this in an engine application where the vortex controlled diffuser inlet flow distortion exceeds that investigated by Adkins requires a particular selection of vortex control diffuser geometric and flow design parameters. The embodiment shown in FIG. 1 shows a prediffuser 20 combined with a specific vortex controlled diffuser 30 having an intermediate range inlet expansion ratio and a pair of split downstream diffuser flow paths 66, 84 to the inner and outer walls 76, 72 of the combustor 14. To accomplish the present invention, four variables are considered including the inlet distortion factor $\alpha$ at the vortex controlled diffuser inlet, the controlled percentage of bleed of the main flow through the bleed gaps 36, 48, the expansion ratios from the region of the gaps 36, 48 and across the fences 35, 46 into the pair of split flow paths 66, 84, henceforth referred to in terms of the ratio of inlet area to outlet area of the diffuser 30 (VCD-$A_R$), and the vortex controlled diffuser ducts (66 and 84) passage length to passage height ratio.

The present invention is suitable for controlling an inlet flow having a distortion factor $\alpha$ in the range of 1.22 at the vortex controlled diffuser inlet. For purposes of the present application, distortion factor is expressed as a kinetic energy distortion factor and by the formula:

$$\alpha = \text{KE flux, actual profile/KE flux, flat profile } (\dot{m} \text{ actual} = \dot{m} \text{ flat})$$

where
$KE = \frac{1}{2}mV^2$ (flat profile)
$\dot{m}$ = mass flow
$V$ = velocity
and wherein profile is the velocity profile across the span of a flow passage. KE flux for the peaked profile must be integrated across the passage.

The present invention preferably includes a prediffuser 20 having an inlet area to outlet area ratio in the range of 1.5. The invention further includes use of the vortex controlled diffuser 30 having an expansion ratio (inlet area to exit area) from the throat region at the gaps 36, 48 to a point downstream of the fences 35, 46 in a range of 1.8. Furthermore, depending upon the degree of distortion factor, the length to height ratio (L/H) in each of the separate flow paths 66, 84 is in the range of approximately 5.0. The bleed flow through bleed gaps 36, 48 is preferably maintained within a range of 8% of the total flow.

The illustrated arrangement, the flow to the dome 86 is scooped up at scoops 96, 102 at a downstream point in the flow paths to each of the separate constant area passages 66, 84 to assure that the high pressure core of pressure profile at the point of expansion downstream of the fences 35, 46 will tend to equalize with lower pressure conditions at the outer and inner walls 68, 34. The resultant pressure equalization that occurs in each of the separate passages 66, 84 will cause a pressure within the cavity immediately upstream of the dome 86 to be substantially like that within the annular outer supply passage 73 and the inner annular supply passage 80.

The FIG. 1 embodiment of the invention is especially suitable to reduce pressure loss from the inlet 18 to the combustor 14 and, moreover, reduces the length of the assembly as compared to engine diffusers of the type set forth in the aforesaid U.S. Pat. No. 3,877,221. Furthermore, it includes a substantial length of passages downstream of the downstream area change in the vortex diffuser 30 in order to produce pressure equalization across the flow profiles in both the inner and outer passages 66, 84.

In the embodiment of FIG. 1, the fences 35, 46 are axially thickened downstream of each of the bleed gaps 36, 48, respectively. It has been observed that such fences improve flow stability by permitting a controlled transition for flow expansion through the vortex control diffuser. The term "thickened" for the purposes of the present specification, is a length which exceeds that of a knife edge fence of the type shown in the aforementioned Adkins paper. It should be understood that the provision of thickened fences is a refinement of a system utilizing knife type edge fences in the vortex control diffuser and that for many applications the provision of fences having knife edge configuration are equally suitable for use as long as they are associated with use of prediffuser with the aforesaid area ratios; vortex controlled diffusers with the aforesaid area ratios; bleed % and split downstream flow passages having the length to height ratios set forth in the preceding material.

The resultant effect of a combination of specific prediffusers; vortex control diffusers and a downstream split flow path assures supply of equal outer and inner combustion annulus total pressures at walls 72, 76, respectively.

While the embodiments of the present invention, as herein disclosed, constitute a preferred form, it is to be understood that other forms might be adopted.

The embodiments of the invention in which an exclusive property or privilege is claimed are defined as follows:

1. A diffuser assembly for distributing high velocity inlet air to the inside and outside walls of an annular combustor having an inlet dome, the assembly comprising: an inlet prediffuser having an inner wall and an outer wall defining an annular inlet and an annular outlet with a divergent flow passage from the inlet to the outlet to produce a useable pressure at the outlet of said prediffuser, said inlet prediffuser having a ratio of outlet area to inlet area of about 1.5, a vortex controlled diffuser downstream of said prediffuser having inner and outer annular fences, said inner and outer walls each having an end surface arranged in spaced axial relationship to said fences to form gaps to bleed air and form vortices and to maintain a uniform flow into the vortex diffuser, said vortex controlled diffuser having a ratio of inlet area to outlet area of about 1.8, said bleed gaps directing about 8% of total inlet air flow from said diffuser assembly, said vortex diffuser having an outlet, splitter means including a pair of constant area passages having a length to height ratio of about 5.0 for uniformly distributing the air flow from said vortex diffuser outlet to the inside wall, outer wall and dome of said combustor to produce a substantially equal pressure condition at the walls of the combustor.

2. A diffuser assembly for distributing high velocity inlet air to ported inside and outside walls of on annular combustor having a ported inlet dome, the assembly comprising: an inlet prediffuser having an inner wall and an outer wall defining an annular inlet and an annular outlet with a divergent flow passage from the inlet to the outlet to produce a useable pressure at the outlet of said prediffuser, a vortex controlled diffuser downstream of said prediffuser having inner and outer annular fences, said inner and outer walls each having an end surface arranged in spaced axial relationship to said fences to form gaps to bleed air and form vortices and to maintain a uniform flow into the vortex diffuser, means for directing the pressurized fluid from said gaps, said vortex diffuser having an outlet, splitter means including a pair of constant area passages having a length to height ratio of about 5 for uniformly distributing the air flow from said vortex diffuser outlet to the inside wall, outer wall and dome of said combustor to produce a substantially equal pressure condition at the walls of the combustor, and means on said splitter means for removing and directing boundary layer flow therefrom to supply combustion air to the ported inlet dome.

3. A diffuser assembly for distributing high velocity inlet air to the inside and outside walls of an annular combustor having an inlet dome, the assembly comprising: an inlet prediffuser having an inner wall and an outer wall defining an annular inlet and an annular outlet with divergent flow passage from the inlet to the outlet to produce a useable pressure at the outlet of said prediffuser, a vortex controlled diffuser downstream of said prediffuser having inner and outer annular fences, said inner and outer walls each having an end surface arranged in spaced axial relationship to said fences to form gaps to bleed air and form vortices and to maintain a uniform flow into the vortex diffuser, means for directing the pressurized fluid from said gaps, said vortex diffuser having an outlet, splitter means including a pair of constant area passages for uniformly distributing the air flow from said vortex diffuser outlet to the inside Wall, outer wall and dome of said combustor to produce a substantially equal pressure condition at the walls of the combustor, said splitter means including an annular inlet tip located downstream of said prediffuser outlet and downstream of said gaps.

4. A diffuser assembly for distributing high velocity inlet air to the inside and outside walls of an annular combustor having an inlet dome, the assembly comprising: an inlet prediffuser having an inner wall and an outer wall defining an annular inlet and an annular outlet with a divergent flow passage from the inlet to the outlet to produce a useable pressure at the outlet of said prediffuser, a vortex controlled diffuser downstream of said prediffuser having inner and outer annular fences, said inner and outer walls each having an end surface arranged in spaced axial relationship to said fences to form gaps to bleed air and form vortices and to maintain a uniform flow into the vortex diffuser, means for directing the pressurized fluid from said gaps, said vortex diffuser having an outlet, splitter means including a pair of constant area passages for uniformly distributing the air flow from said vortex diffuser outlet to the inside wall, outer wall and dome of said combustor to produce a substantially equal pressure condition at the walls of the combustor, said splitter means including an annular inlet tip located upstream of the outlet of said prediffuser and upstream of said gaps to produce flow division prior to vortex control of flow from the prediffuser into the vortex controller diffuser.

* * * * *